United States Patent [19]

Strobel et al.

[11] Patent Number: 5,244,780
[45] Date of Patent: Sep. 14, 1993

[54] ELEMENT HAVING ADHESION OF GELATIN AND EMULSION COATINGS TO POLYESTER FILM

[75] Inventors: Mark A. Strobel, Maplewood; Robert L. Carlson, St. Paul; Steven L. Ginkel, Edina; Jeffrey L. Solomon, Inver Grove Heights, all of Minn.

[73] Assignee: Minnesota Mining and Manufacturing Company, St. Paul, Minn.

[21] Appl. No.: 706,056

[22] Filed: May 28, 1991

[51] Int. Cl.$^5$ .............................................. G03C 1/76
[52] U.S. Cl. ................................ 430/535; 428/463; 430/523; 430/529; 430/533
[58] Field of Search ............... 430/529, 535, 523, 533; 428/463

[56] References Cited

U.S. PATENT DOCUMENTS

| | | | |
|---|---|---|---|
| H688 | 10/1989 | Sobataka et al. | 204/165 |
| 2,331,717 | 10/1943 | Nadeau et al. | |
| 2,360,216 | 10/1944 | Filluis | |
| 2,761,419 | 9/1956 | Mercier et al. | 118/412 |
| 2,761,791 | 9/1956 | Russell | 117/34 |
| 2,828,070 | 4/1958 | Osborn | 117/93 |
| 3,615,545 | 10/1971 | Kalenda et al. | 430/535 |
| 3,639,134 | 2/1972 | Stegmeier et al. | 117/7 |
| 3,738,838 | 6/1973 | Ando et al. | 430/535 |
| 3,755,683 | 8/1973 | Kiikla et al. | 250/542 |
| 3,761,299 | 9/1973 | Lidel | 117/34 |
| 3,892,575 | 7/1975 | Watts et al. | |
| 4,072,769 | 2/1978 | Lidel | 427/38 |
| 4,128,426 | 12/1978 | Ohta et al. | |
| 4,237,156 | 12/1980 | Boultinghouse | 427/255.1 |
| 4,296,151 | 10/1981 | Boultinghouse | 427/255.1 |
| 4,329,423 | 5/1982 | Ealding et al. | 430/535 |
| 4,363,871 | 12/1982 | Shibue et al. | 430/535 |
| 4,491,653 | 1/1985 | McGinniss et al. | 525/356 |
| 4,689,359 | 8/1987 | Ponticello et al. | 524/23 |
| 4,695,532 | 9/1987 | Ponticello et al. | 430/533 |
| 4,717,516 | 1/1988 | Isaka et al. | 264/22 |
| 4,717,623 | 1/1988 | Brown et al. | 428/409 |
| 4,743,419 | 5/1988 | Bierschenk | 264/83 |
| 4,916,011 | 4/1990 | Miller et al. | 430/535 |

FOREIGN PATENT DOCUMENTS

| | | |
|---|---|---|
| 1027326 | 7/1978 | Canada . |
| 0005510B1 | 11/1981 | European Pat. Off. . |
| 0213896 | 11/1987 | European Pat. Off. . |
| 1579924 | 8/1969 | France . |
| 1168171 | 10/1969 | United Kingdom . |
| 1395949 | 5/1985 | United Kingdom . |

OTHER PUBLICATIONS

"Acid-Base Surface Properties of Modified Poly(ethylene Terephthalate) Films and Gelatin: Relationship to Adhesion," L. Lavielle, J. Schultz, and K. Nakajima, *J. Appl. Polym. Sci,* 42,2825-2831, May 20, 1991.

*Primary Examiner*—Jack P. Brammer
*Attorney, Agent, or Firm*—Gary L. Griswold; Walter N. Kirn; Mark A. Litman

[57] ABSTRACT

A polymeric film substrate is first modified, then coated with a polyalkyl acrylate/gelatin layer to improve the wet adhesion of the layer to the substrate. The layer may itself contain a photographic emulsion or emulsion layers may be adhered to that layer.

21 Claims, No Drawings

ELEMENT HAVING ADHESION OF GELATIN AND EMULSION COATINGS TO POLYESTER FILM

BACKGROUND OF THE INVENTION

The use of corona discharges in air to provide treatments to modify the surface of various polymer articles to improve their wettability, adhesion properties, ink receptivity, etc. is well known in the art. Such corona treatment apparatus has been used for example in U.S. Pat. No. 3,755,683 (Kiikka and Hartman) to improve adhesive qualities for use in, among other things, heat sealing operations and photographic coating and subcoating operations in which a photographic emulsion, nucleating layer, actinic radiation-sensitive layer, or the like is coated onto the polymeric film.

U.S. Pat. No. 3,761,299 (Lidel) discloses a reduced pressure plasma process for improving the adhesion of vinyl-sulfone-hardened photographic emulsions directly coated on poly(ethylene terephthalate), (PET). The process uses a reactive gas/activator gas to produce a radio frequency (RF) plasma and the inventor specifically states that ". . . the process is extremely inefficient if practiced with ambient pressures . . . ."

U.S. Pat. No. 4,072,769 (Lidel) discloses the direct coating of photo emulsion to PET treated in reactive gas/inert-gas carrier coronas at reduced pressure. From the comparative examples it is not obvious that nitrogen alone would improve photographic emulsion adhesion.

J59-56430 (Tamaki and Tatsuda) disclose plasma treatment of PET in the outgas of the film as it is processed and in low pressure atmospheres of Ar, $N_2$, $O_2$, and air and show that even small amounts of these gases degrade the wet adhesion of the emulsion to the substrate.

One of the earliest disclosures of nitrogen atmosphere corona treatment of PET and polyolefins was U.S. Pat. No. 3,639,134 (Stegmeir et al.) wherein nitrogen or carbon dioxide or up to 15% air with nitrogen or carbon dioxide was used as the atmosphere surrounding the corona and wherein the polymer treated was heated between room temperature and 25° C. below its melting point, thus giving increased polymer heat sealability.

EP 5,510 B1 (Deguchi et al) describes a process for preparing a PET film having a nitrogen-containing layer, less than 10 nm thick, with an ESCA atomic ratios of N/C greater than 0.01 using a room temperature nitrogen corona with oxygen concentration less than 0.1%.

U.S. Pat. No. 4,717,516 (Isaka and Nagano) show a process for enhancing adhesion to PET that is corona treated in nitrogen having specific ESCA atomic ratios of N/C and O/C. Control of oxygen is discussed with a preferred range less than 0.1%.

U.S. H688 (Sobataka and Wolfe) describes a process for the nitrogen corona treatment of PET at less than 350 ppm, and preferably less than 5 ppm of oxygen, to improve ink adhesion.

U.S. Pat No. 4,689,359 and U.S. Pat. No. 4,695,532 (Ponticello and Otocka) teach the use of polyethyl acrylate (PEA) as a component in a photographic element to assist in adjusting the hydrophilic and hydrophobic properties of the coated layer.

Flame treatments of polymer films are also well known in the art as a surface modification treatment. Many of these processes have been used to increase the adherence of the polymer surfaces. Representative of film treatment processes are U.S. Pat. Nos. 2,632,931; 2,648,097; 2,683,894; 2,704,382; and 2,746,084.

Fluorine treatments of polymer films have also been used in the art to modify the surface properties of the films, including efforts to improve their adherence. Canadian Patent 1,027,326 discloses the rapid fluorination of polyolefin substrates to improve adhesion. U.K. Patent 1,395,949 discloses the fluorination or carboxylation of polyester materials to improve the dyeability of the surfaces.

U.S. Pat. Nos. 4,296,151; 4,717,623 and 4,743,419 describe various fluorine surface treatments of polymeric films, including olefinic resins and polyesters to improve their surface properties. U.S. Pat. No. 4,717,623 specifically discloses the use of the fluorine treated films to increase the adhesion of radiation-curable coating compositions.

SUMMARY OF THE INVENTION

The invention is a photographic film which is constructed with a polyalkyl acrylate (or methacrylate)/gelatin containing layer coated on a surface treated polyester substrate, and particularly a flame-treated, or fluorine treated or a heated nitrogen corona treated PET substrate, said PET substrate having no previously applied priming or subbing layer. The polyalkyl acrylate (or methacrylate)/gelatin containing layer is contingent to the substrate and may either incorporate a photographic emulsion, contain an antihalation dye and/or is the bottom layer of a wet-on-wet multi-layer coating with a photographic emulsion incorporated within at least one layer. The layer may contain other additives or be free of photographic addenda. Another aspect of the invention is the process for making the photographic film.

DETAILED DESCRIPTION OF THE INVENTION

Photographic film is traditionally made by coating layers of silver halide emulsions and dyes on a transparent polymer film backing. Various methods have been used to promote adhesion of the emulsion layers to the film backing. It has been necessary, in the past, to use priming, and often so-called gel subbing layers, to provide an intermediate layer that would adhere to the film backing and to which the emulsions would in turn adhere. The use of corona and other surface treatments of the film backing have been used to promote adhesion of the subbing layers and also to attempt to coat the emulsions directly on the film backing.

In the present invention, it has been found, that a superior photographic film construction results from the correct combination of polymer treatment and emulsion chemistry, and completely eliminates the need for any previously applied prime or subbing layers for adhesion promotion. Such a construction provides the following advantages:

1) Excellent wet adhesion of the emulsion to the substrate.
2) No priming or subbing layer required, thus eliminating cost of materials and waste disposal problems.
3) Fewer process steps providing less chance of errors, flaws and waste, which directly translates into lower costs.
4) Any or all of the substrate can be recycled at any time before emulsion coating without the costly and time consuming removal of any priming or subbing layers.

5) Exceptional coatability, especially for high viscosity emulsions.

6) An increase in transparency is often noted, in part due to elimination of the prime and/or subbing layer(s).

The process of the invention is carried out by first treating the polyester substrate by flame treatment, fluorine treatment, or nitrogen corona treating the PET film backing at an elevated temperature, secondly coating the so treated backing with the properly formulated chemistry, thirdly, drying the coated film and lastly final preparation such as slitting, winding and packaging the finished product.

The three types of surface treatments described above are believed to provide three characteristics to the polymer surface, particularly to the polyester poly(ethylene terephthalate) film surfaces. The three unifying characteristics are an increase in the oxygen content of the treated surface as compared to the bulk material, an increase in the hydrophilicity of the surface, and an increase in the acidity of the surface. It is believed that these alterations in the surface of the film increase the wet adhesion to the emulsion layer (e.g., the polyalkyl acrylate/gelatin coating layer).

Nitrogen corona treatment can be carried out on any commercial corona treater as will be known to those skilled in the art. The corona area is purged with nitrogen, to an oxygen concentration of less than 200 ppm and preferably less than 50 ppm. The corona energy should be between 0.1 and 1.0 J/cm$^2$ and preferably between 0.2 and 0.5 J/cm$^2$. The temperature of the PET film substrate during nitrogen corona treatment should be above the glass transition temperature of the film but less than the melting point of the film, preferably between 100° C. and 120° C.

The preferred oxygen concentration, at the corona, for this process, is less than 200 ppm and most preferred less than 20 ppm. A side benefit of these low oxygen concentrations, is that no environmental control of emissions is necessary because of the low levels of $NO_x$ and $O_3$ produced.

Flame treatment can be carried out on any commercial gas flaming equipment known to those skilled in the art. Either high-velocity or ribbon burners may be used. The air:fuel ratio of the combustion mixture must be less than the stochiometric ratio (typically 9.6 for air:natural gas mixtures) and preferably between 8.8 and 9.4 by volume. (This air:fuel mixture produces a so-called "reducing" or "rich" flame.) Although natural gas with an energy value of approximately 1000 BTU/ft$^3$ is the preferred fuel, other gaseous hydrocarbons such as acetylene, ethane, propane, butane, or liquefied petroleum gas (LPG) can also be used, provided that the air:fuel ratio is adjusted to less than stochiometric. Although air is the preferred oxidizer, oxygen or oxygen-enriched air can be used, again provided that the air:fuel ratio is adjusted to less than stochiometric.

The desired flow rate of fuel may be adjusted to provide the optimal thermal output for a given width, thickness, and processing speed of the PET film backing. The volume of gas burned should be 0.4–6.0 liters of natural gas per square meter of PET to be flamed, and preferably between 0.6–1.5 liters of natural gas/m$^2$ PET. Exposure times to the flame should be between 0.001–0.05 seconds to prevent thermal damage to the PET backing.

Fluorine treatment of polymer surfaces is usually effected by injecting a flow of gas including gaseous fluorine (usually mixed with an inert gas) so that it contacts the surface to be treated. The concentration of $F_2$ is usually between 0.1 and 60% by volume. The contact time of the fluorine with the surface is usually between 0.02 and 25 seconds, preferably between 0.05 and 12 seconds. Some processes have exposure times at low fluorine concentrations of up to an hour or more, but this is not really an advantage. The temperature of the gas and/or substrate is usually maintained between 10° and 80° C. Some minor amounts of oxygen can be present with the fluorine to facilitate oxidation of the polymer surface.

The fluorine treatment of film surfaces is thought to be a random substitution of fluorine for hydrogen throughout the backbone of the polymer. ESCA confirms the presence of fluorine on the surface of the treated film. The displaced hydrogen reacts with remaining fluorine to form hydrogen fluoride which is carried out of the treatment box by the purge gas. Oxygen is also present in the treatment box and becomes incorporated into the film.

The wet adhesion of coatings of a photographic emulsion containing a hydrophobic latex were examined on polyester treated as a moving web for 0.5 seconds for fluorine in nitrogen over the range of 9.1 volume % down to 0.5 volume %. Excellent adhesion was found over the range of 9.1 volume % to 1.2 volume % with adhesion failure noted at 0.5 volume % fluorine.

The emulsion layer(s) contains gelatin, a silver halide emulsion, a polyalkyl acrylate latex as an adhesion promoter, a gelatin crosslinking agent (hardener) and a controlled pH of greater than 5.8.

The coated emulsion chemistry layer can be either a single layer of a mixture of the appropriate ingredients, or be a so called wet-on-wet multilayer coating wherein the various ingredients are coated simultaneously. In the latter multilayer case, the polyalkyl acrylate/gelatin containing layer would be the lowest layer, with the photographic coating, anti-halation layers, or other layers applied thereon but simultaneously.

This invention emphasizes the use of both acid-processed and lime-bone gelatins, including acid bone gelatin or pigskin gelatin, since they are preferred in the industry for manufacturing these types of products.

Polyalkyl acrylates of 1 to 8 carbon atoms may be used in the practice of the present invention. Polyalkyl acrylates of 2 to 4 carbon atoms are preferred. Polybutyl acrylate, PBA, is the preferred acrylate latex for this invention in a preferred concentration of 25 to 300% and a most preferred concentration of 50 to 100% by weight to gelatin.

The gelatin crosslinking agent (hardener) is preferably an aldehyde, such as formaldehyde, glyoxal, or a formaldehyde precursor, such as dimethylolurea. Vinyl sulfones have also been found to be effective crosslinking agents. The amount of hardener selected is the desired level needed to satisfactorily produce the product. Hardener concentration tends to limit adhesion, when formaldehyde or a formaldehyde precursor is employed, so adhesion will always be better at lower concentrations. If formaldehyde is used the preferred concentration is 0.1 to 0.7% by weight to gelatin, most preferably 0.2 to 0.5 wt. %. Triazine crosslinking agents, as well as other known agents, may be used.

The pH of the coating should be controlled, and is preferred to be in the range of 5.8 to 8.5, most preferably between 7.0 and 7.5.

Drying and further processing of the treated and coated film can be by any of the many convenient methods known to those in the art.

The invention and process for making it can best be exemplified by the following non-limiting examples.

Wet adhesion of the prepared films was tested by immersing a one inch wide sample of the dried coated construction in a beaker of DuPont Cronex TM X-ray developer/replenisher for 6 minutes. The film was then removed and placed on a flat surface and the wet coating was scored in a cross-hatch pattern with a sharp stylus or the pointed edge of a razor blade to remove the coating and penetrate the PET substrate surface. The wet surface was then rubbed vigorously with a gloved thumb in a back and forth motion 16 times in an effort to induce coating peeling. The coating was then rinsed with water. The coating adhesion was evaluated in terms of area of emulsion removed on a scale of 0 to 10 as shown in the following table:

10 no emulsion removed
9 5% removed
8 10% removed
6 40% removed
4 60% removed
2 80% removed
0 100% removed Any value of 8 or above is considered acceptable.

EXAMPLE 1

Thermally extruded, biaxially oriented 4-mil thick, 12-inch wide poly(ethylene terephthalate) substrate was corona-treated in a substantially nitrogen atmosphere at a corona energy of 0.25 J/cm$^2$, which corresponds to a corona power of 1500 W at a substrate speed of 300 fpm. The corona treatment was performed on a corona system built by Sherman Treaters, Ltd., and equipped with an ENI Power Systems Model RS-48 (4 kw) power supply. During treatment, the PET substrate was in contact with a nickel-plated aluminum ground roll electrode (the so-called "bare-roll" configuration) that was heated with pressurized water to 105° C. to maintain the temperature of the PET at 100° C. during corona treatment. The powered corona electrode consisted of three 15-cm diameter aluminum cylinders covered with 2.4-mm thick silicone-rubber dielectric sleeves. The electrode gap was 1.4 mm. The treater housing was continually flushed with cryogenically generated nitrogen gas at ca. 400 lpm to maintain the oxygen concentration in the corona discharge at less than 20 ppm.

A photographic silver iodobromide emulsion containing 8.6% by weight Croda lime-bone gelatin and 11.5% by weight elemental silver (in the form of silver iodide and silver bromide) in deionized water was melted and maintained at 40° C. The appropriate amount of a polyethyl acryate latex that is 20% polyethyl acrylate solids by weight in water was heated to 40° C. and added with stirring to the above silver halide emulsion to give a PEA-to-gelatin ratio of 1:1 by weight. The PEA latex was made from emulsion-polymerized ethyl acrylate to a particle size of 500 to 700 Angstroms. The appropriate amount of a 3.75% solution in water of Eastman Chemical Practical Grade glyoxal was then added with stirring to give a glyoxal concentration of 0.87% by weight to gelatin. The pH of the emulsion, originally at 6.9, was adjusted to 7.0 by addition of NaOH.

The emulsion mixture described was then coated onto the nitrogen-corona-treated PET base by the slide coating method described in U.S. Pat. Nos. 2,761,419 and 2,761,791 as the bottom layer of a three-layer wet-on-wet coating construction. The middle layer of this construction consisted of a photographic film emulsion containing 4% Croda lime-bone gelatin, 5.35% elemental silver, 1.2% PEA latex, and 0.83% glyoxal hardener (all by weight). The top layer consisted of a gelatin-containing top coat with 5.3% Croda lime-bone gelatin and 0.65% glyoxal hardener by weight. The relative flows of the three layers from bottom to top during slide coating were 2:10.8:3.5 by volume.

The coated layers were chilled and dried by air impingement following the coating operation. The coated construction described above was tested for wet adhesion according to the procedure previously described. The adhesion was found to be "10" (no removal of emulsion).

EXAMPLE 2

A nitrogen-corona-treated PET substrate was prepared in the same manner as in Example 1.

An 8.6% by weight solution of Kind and Knox pigskin gelatin in water was prepared by soaking the appropriate amount of gelatin in deionized water at 25° C. for 60 minutes, heating the gelatin and water to 60° C. for 15 minutes, then cooling to 40° C. and holding. The gelatin solution was then diluted with deionized water to give 5.73% gelatin by weight. The appropriate amount of polyethyl acryate latex (20% PEA solids in water) to give a PEA-to-gelatin ratio of 0.5 by weight was heated to 40° C. and then added with stirring to the gelatin solution. The pH of the solution, originally at 5.8, was adjusted to 7.25 by addition of NaOH. No gelatin hardener was added.

This mixture was coated on nitrogen-corona-treated PET substrate by the slide coating method of Example 1 as the bottom layer of a three-layer wet-on-wet coating. The middle layer consisted of the same emulsion as the middle layer in Example 1 except that 0.275% formaldehyde by weight was substituted for the glyoxal as the gelatin hardening agent. The top layer was identical to the top layer of Example 1 except that 0.32% formaldehyde was substituted for the glyoxal. The relative flows of the three layers (from bottom to top) were 2.4:10.8:3.5. Following the coating operation, the layers were chilled and dried by air impingement. The coated photographic construction was then tested for wet adhesion according to the procedure previously described. The adhesion was found to be "10" (no removal of emulsion).

EXAMPLE 3

The PEA-containing photographic emulsion described as the bottom layer of Example 1 was maintained at 40° C. An approximately 8"×10" sheet of PET treated in a corona by the method of Example 1 was placed on a flat surface and fixed in place. A streamer of ca. 5 ml of emulsion liquid was run along the top of the sheet and a coating was drawn out with a #24 wire-wound rod. The coated substrate was placed in a forced air oven at 40° C. and dried for approximately 5 minutes. The coating was allowed to stand at 25° C. for at least 24 hours prior to testing for wet adhesion. The coating thus prepared was tested for wet adhesion according to the procedure previously described and found to give "10" (no removal of emulsion).

EXAMPLE 4

Thermally extended, biaxially oriented, 7 mil thick 12-inch wide poly(ethylene terephthalate) substrate was treated for 0.5 second at a fluorine concentration of 1.2% in nitrogen. This corresponds to a $F_2/N_2$ flow rate of 1.012 lpm and a substrate speed of 120 fpm. The treated polyester was coated with the following emulsion mixtures.

|  | 1 | 2 |
| --- | --- | --- |
| X-ray emulsion | 100 g | 100 g |
| Water | 100 | 100 |
| PEA latex (20% in water) | 30 | — |
| Triton X-200 (4.25% in water) | — | 3.0 |
| Formaldehyde (3.75% in water) | 1.0 | 1.0 |

The coatings were made with a #24 wire-wound, rod and dried 3-5 minutes at 45° C. The samples were allowed to age 4 days and were then tested for wet adhesion according to the procedure previously described. The above gave a score of "10" for sample number 1 with the PEA latex and a score of "0" for sample number 2 without the addition of the latex.

EXAMPLE 5

PET was fluorine treated for 0.5 second at a fluorine concentration of 4.8 volume %. A roll of the treated PET was coated at a speed of 300 fpm employing a slide coating method. Samples were collected and air dried following the coating operation. The following solution preparation was coated:

Soak 860 g gelatin (Croda, A-777) in 15.0 kg water for 60 minutes. Heat and maintain at 60°-65° C. for 15 minutes with stirring. Cool to 40° C. Add 3000 g of a latex of PEA (20%). Adjust the pH to 7.0 with 2.0 N sodium hydroxide. Filter. Add 17.5 g of a 3.75% formaldehyde solution.

The coating was tested for wet adhesion as described previously and was given a score of "10", demonstrating no adhesion failure. Dry adhesion was tested by scoring in a cross hatch pattern so as to penetrate completely the gelatin coating and into the PET. 3M #610 tape (2 inch) was firmly attached to the surface and then rapidly pulled off. The test was repeated in the same area. Examination of the scored edges on a light table indicated that no adhesion failure had occurred. The dry adhesion was therefore also rated a score of "10".

EXAMPLE 7

PET was treated as a moving web for 0.5 second at a fluorine dilution of 1.2% in nitrogen. A roll of this material was coated with the 3 layer construction described in Example 1. The relative flows in the three layers (from bottom to top) were 1.2:10.8:3.5. The coating was allowed to age and samples taken and tested for wet and dry adhesion according to the procedures described previously. No evidence of either wet or dry adhesion failure was noted and therefore the samples tested were given scores of "10".

EXAMPLE 8

A 5.4% by weight solution of Croda acid-bone gelatin was prepared by soaking the appropriate amount of gelatin in deionized water at 25° C. for 60 minutes, heating the gelatin and water to 60° C. for 15 minutes, then cooling to 40° C. and holding. A latex 20% in polyethyl acrylate was then added to the gelatin to give the PEA:gelatin ratio of 0.7. The pH was adjusted to 7.0 with a NaOH solution. This mixture was coated as the bottom layer of a 3-layer wet-on-wet photographic construction where the middle layer is a conventional gelatino-silver iodobromide emulsion with a protective top coat. The coating was made by the slide coating method described in U.S. Pat. Nos. 2,761,419 and 2,761,791, with the flows (from bottom to top) in the ratio of 2.0:10.8:3.5 by volume. The coating was applied to a biaxially oriented poly(ethylene terephthalate) film support whose support has been treated with an air:-natural gas flame (ratio 9.0:1.0).

Thermally extruded, biaxially oriented 4-mil (0.1 mm) thick, 12-inch (30.5 cm) wide poly(ethylene terephthalate) substrate used in the present invention was flame treated at a substrate speed of 100 m/min in a reducing flame generated from a mixture of 425 liters per minute (lpm) of air and 47 lpm of natural gas (1000 BTU/ft$^3$), giving an air:fuel mixture of 9.0. The gas flaming was performed on a system built by Sherman Treaters, Ltd., and equipped with a high-velocity type burner. During flaming, the PET substrate was in contact with a water-cooled nickel-plated steel drum maintained at 20°-25° C. to reduce thermal damage to the PET. The gap between the uppermost surface of the burner and the PET substrate was 25 mm.

The coated layers were chilled and dried by air impingement following the coating operation. The coated construction described above was tested for wet adhesion according to the procedure previously described. The adhesion was found to be "10" (no removal of emulsion).

The dry adhesion of the above film construction was tested after processing in Cronex ™ x-ray developer and drying at 55° C. by scribing in a cross hatch pattern forming ¼" squares and then firmly pressing a piece of No. 610 Scotch Tape (3M Co., St. Paul, Minn.) over the scribed pattern and removing by quickly ripping the tape from the surface at a 30° angle. The tape peel was then repeated in the same area. After two peels, no adhesion failure was noted, giving a score of "10".

EXAMPLE 9

A 500 g amount of gelatino-silver iodobromide x-ray emulsion (8.6%) in gelatin was weighed out. Five hundred grams of water was added and the mixture was heated to 40° C. and 215 g of a latex 20% in polyethyl acrylate was added. The pH was adjusted to 7.0 with a NaOH solution.

The above mixture was then coated as the bottom layer of a 3-layer wet-on-wet photographic construction where the middle layer is a conventional gelatino-silver iodobromide emulsion with a protective top coat. The coating was made by the method described in Example 1. The flows were in the ratio of 12:108:35 from the bottom to top layers respectively. The coating was applied to a biaxially oriented polyethylene terephthalate film support which had been treated for 0.5 second in an atmosphere of 1.2% fluorine diluted with nitrogen.

The coated photographic construction was tested for wet adhesion according to the procedure previously described. The adhesion was found to be "10" (no removal of emulsion).

EXAMPLE 10

A coating solution was prepared by mixing 9 g of a latex 32.2% in polybutyl methacrylate with 100 g of a gelatino-silver iodobromide emulsion 8.6% in gelatin together with 1.0 g of a 3.75% formaldehyde solution. This mixture was coated onto biaxially oriented poly(ethylene terephthalate) film support whose surface had been treated for 0.5 second in 4.8% fluorine diluted with nitrogen. The coating was applied as a streamer of 5 ml of liquid run along the top of the sheet and drawn out with a #24 wire-wound rod. The coated substrate was placed in a forced air oven at 45° C. and dried for approximately 5 minutes. The coating was allowed to stand at 25° C. for at least 24 hours prior to testing for wet adhesion. The coating thus prepared was tested for wet adhesion according to the procedure previously described and found to give "10" (no emulsion removal).

EXAMPLE 11

A coating solution was prepared by mixing 20 g of a latex 30.0% in polybutyl acrylate with 100 g an x-ray of emulsion 8.6% in gelatin together with 1.0 g of a 3.75% formaldehyde solution. This mixture was coated onto biaxially oriented poly(ethylene terephthalate) film support whose surface had been treated with an air:natural gas flame (9.0:1.0 ratio). The coating was applied as a streamer of 5 ml of liquid run along the top of the sheet and drawn out with a #24 wire-wound rod. The coated substrate was placed in a forced air oven at 45° C. and dried for approximately 5 minutes. The coating was allowed to stand at 25° C. for at least 24 hours prior to testing for wet adhesion. The coating thus prepared was tested for wet adhesion according to the procedure previously described and found to give "10" (no emulsion removal).

EXAMPLE 12

The mixture of polybutyl acrylate and the x-ray emulsion described in Example 11 was coated by the same technique onto a biaxially oriented poly(ethylene terephthalate) support that had been treated for 0.5 seconds in an atmosphere of 1.2% fluorine diluted with nitrogen.

The dried coating was aged at room temperature for 24 hours and then tested for wet adhesion according to the procedure previously described and found to give "10" (no removal of emulsion).

We claim:

1. A support layer comprising a polyester polymeric film having a coating adhered to at least one surface of said film, said at least one surface having
   a) an oxygen content higher than that of the composition of the film,
   b) an acidity greater than that of the composition of the film, and
   c) hydrophilicity which is greater than that of the composition of the film, and said coating comprising a mixture of polyalkyl acrylate or polyalkyl methacrylate and gelatin.

2. The layer of claim 1 wherein said mixture comprises an emulsion of a polyalkyl acrylate or polyalkyl methacrylate having 1 to 8 carbon atoms in the alkyl group thereof.

3. The layer of claim 2 wherein said emulsion comprises polyethyl acrylate or polybutyl acrylate in a weight to weight ratio to gelatin of from 1:5 to 1.5:1.

4. The layer of claim 2 wherein said emulsion has photographic silver halide therein.

5. The layer of claim 3 wherein said emulsion has photographic silver halide therein.

6. The layer of claim 1 wherein said coating has a layer adhered thereto which comprises photographic silver halide in a hydrophilic colloidal binder.

7. The layer of claim 2 wherein said coating has a layer adhered thereto which comprises photographic silver halide in a hydrophilic colloidal binder.

8. The layer of claim 3 wherein said coating has a layer adhered thereto which comprises photographic silver halide in a hydrophilic colloidal binder.

9. The support layer of claim 1 wherein said polymeric film comprises poly(ethylene terephthalate).

10. The support layer of claim 2 wherein said polymeric film comprises poly(ethylene terephthalate).

11. The layer of claim 2 wherein said emulsion comprises an acrylate selected from the group consisting of polyethyl acrylate, polybutyl acrylate, or polybutyl methacrylate, in a weight-to-weight ratio to gelatin of from 1:5 to 1.5:1.

12. The layer of claim 10 wherein said emulsion comprises an acrylate selected from the group consisting of polyethyl acrylate, polybutyl acrylate, or polybutyl methacrylate, in a weight-to-weight ratio to gelatin of from 1:5 to 1.5:1.

13. The layer of claim 11 wherein said emulsion contains photographic silver halide.

14. The layer of claim 12 wherein said emulsion contains photographic silver halide.

15. The layer of claim 2 wherein said emulsion contains antihalation dye therein.

16. The layer of claim 11 wherein said emulsion contains antihalation dye therein.

17. The layer of claim 12 wherein said emulsion contains antihalation dye therein.

18. The layer of claim 2 wherein said coating has a layer adhered thereto comprising an antihalation dye.

19. The support layer of claim 1 wherein said surface is produced by treating poly(ethylene terephthalate) in a flame where the air:fuel ratio is less than 1.0 the stochiometric.

20. The support layer of claim 1 wherein said surface is produced by treating poly(ethylene terephthalate) in an atmosphere of fluorine diluted with nitrogen where the fluorine concentration is from 0.2 to 20 percent and the treatment time is less than 10 seconds.

21. A support layer comprising a polymeric poly(ethyleneterephthalate) film having a coating adhered to at least one surface of said film, said at least one surface having:
   a) an oxygen content higher than that of the composition of the film,
   b) an acidity greater than that of the composition of the film, and
   c) Hydrophilicity which is greater than that of the composition of the film,
and said coating comprising a mixture of polybutylacrylate and gelatin.

* * * * *